March 12, 1935.  W. RAYMOND  1,994,179
CYLINDER RELIEF VALVE FOR COMPRESSORS
Filed June 5, 1930
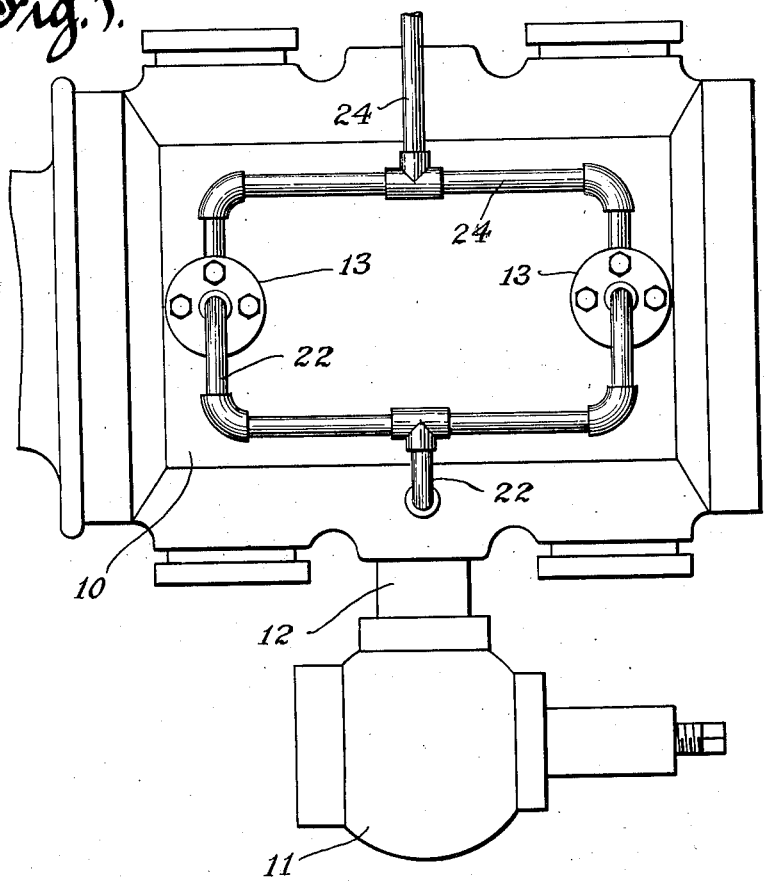
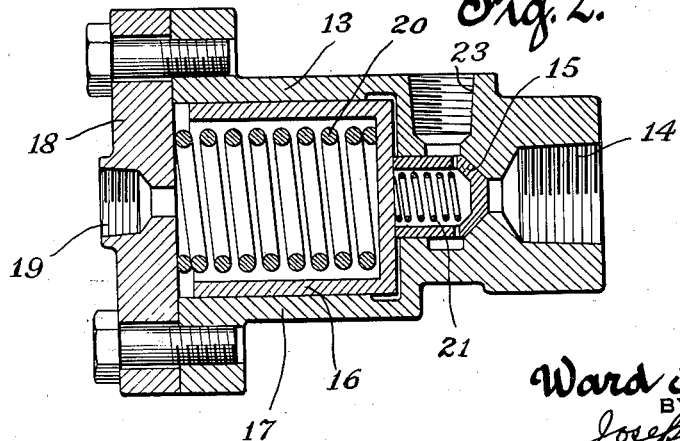
INVENTOR
Ward Raymond
BY
Joseph P. Schofield
ATTORNEY Patented Mar. 12, 1935

1,994,179

UNITED STATES PATENT OFFICE 1,994,179

CYLINDER RELIEF VALVE FOR COMPRESSORS

Ward Raymond, Easton, Pa., assignor to Pennsylvania Pump & Compressor Company, Easton, Pa., a corporation of Pennsylvania Application June 5, 1930, Serial No. 459,279

2 Claims. (Cl. 137—153)

This invention relates to relief valves and particularly to a cylinder relief valve for air and gas compressors.

An object of the invention is to provide an improved form of relief valve for compressor cylinders adapted normally to be retained in closed position but adapted, when the compressor is operating unloaded, to permit the air or gas to be exhausted from the cylinder directly to atmosphere.

Another object of the present invention is to provide combined spring and fluid pressure means for retaining a cylinder relief valve in its closed position so that under normal operations the combined action of the fluid pressure and spring will be sufficient to retain the relief valve in its closed position, but which, when pressure within the fluid means is materially reduced, will permit the valve to open and allow air or gas within the cylinder to escape without being compressed.

A still further object of the invention is to provide a relief valve for compressors that will be held closed during normal operation of the compressor but that will open when the compressor is operating unloaded and will return to closed position when the compressor is again operating normally.

And finally it is an object of the invention to operate a cylinder relief valve directly by variations in pressure of the air or gas within the compressor intake by simple, inexpensive means not easily put out of order and which has a minimum of operating parts.

With these and other objects in view, my invention includes the features of construction and operation set forth in the following specification and illustrated in the accompanying drawing.

In the accompanying drawing annexed hereto and forming a part of this specification, I have shown my invention embodied in a preferred form of relief valve for a single stage compressor, but it will be understood that the invention can be otherwise embodied and that the drawing is not to be construed as defining or limiting the scope of the invention, the claims appended to this specification being relied upon for that purpose.

In the drawing:

Figure 1 is a side elevation of a compressor cylinder provided with the relief valve forming the present invention attached thereto, and Fig. 2 is a longitudinal sectional view centrally through one of the relief valves.

In the above mentioned drawing I have shown but one embodiment of the invention which is now deemed preferable, but it is to be understood that changes and modifications may be made within the scope of the appended claims without departing from the spirit of the invention.

In the operation of compressors for air or other gases, it is usual to provide some form of unloading mechanism enabling the compressor to operate without delivery of additional compressed air or other gas. A common method of effecting this unloading of a compressor is to provide means for closing the intake passages to the cylinder so that no air or gas may be drawn into the cylinder. The pressure within the cylinder thus becomes greatly reduced and the piston reciprocates within this reduced pressure. During the period of unloaded operation the only air or gas compressed is that leaking past the valves into the cylinder. In operating compressors with this method of unloading, it is desirable to provide means for relieving the pressure within the cylinders whenever the terminal pressure becomes excessive and also as soon as the intake valve closes and a materially reduced pressure is produced within the intake passage.

The relief valve forming the present invention is therefore adapted for attachment to a compressor cylinder, one end of the relief valve being connected to the interior of the cylinder, corresponding relief valves being placed at opposite ends of the compressor cylinder.

Referring more in detail to the figures of the drawing, I provide a compressor cylinder 10 having an intake closing valve 11 forming a regulator or unloading means directly attached to the compressor intake. This valve 11 is attached directly to the intake connection 12 of the cylinder. As this form of intake closing valve is old and well-known, it is not thought necessary to describe it in detail. It will suffice to state that this valve 11 may be completely closed when the air or gas has been compressed to a predetermined pressure and may be again opened when the pressure is reduced and additional air is desired.

Connected to the opposite ends of the cylinder 10 are the body members 13 of the relief valves, these being similar in form and preferably having a threaded opening 14 at one end enabling them to be connected as by a short length of pipe directly to an opening into the interior of the compressor cylinder 10.

Within this body member 13 is a valve 15 pressed normally against a seat formed within the body member 13 so that when this valve 15 is closed air or gas cannot pass and escape to atmosphere through the opening 14 and pipe connections connected thereto. Holding this valve 15 toward its closed position is a piston 16 operating within a cylinder 17 formed within the body member 13. The outer end of the body member 13 is closed by a suitable head 18 secured thereto having an opening 19 for a purpose presently to be described. A spring 20 disposed within the cylinder 17 normally forces the piston 16 against the valve 15. A small and light spring 21 disposed within the valve 15 the outer end of which engages against the inner end of the piston 16 also serves to hold the valve 15 toward its seat. The opening 19 within the head 18 as shown in Fig. 1, is adapted to be connected by suitable piping 22 to a portion of the compressor intake between the cylinder 10 and the intake valve 11.

Normally and with the compressor operating under load, the pressure within the intake passages 12 is substantially atmospheric, which pressure is exerted against the full diameter of the piston 16 by the connection 22 aiding the spring 20 in maintaining the valve 15 toward its seat. As soon, however, as the intake valve 11 operates to close the connection to intake 12 and a subatmospheric or sub-normal pressure exists within the intake passage the pressure exerted against the piston 16 is materially reduced. Thus reduced, the piston 16 is drawn toward the head 18, thus relieving the valve 15 from any pressure except that of the light spring 21 forcing it toward its seat. The valve 15 therefore, whenever there is any appreciable pressure within the end of the compressor cylinder 10, opens and allows the air or gas to escape to atmosphere. For this purpose a lateral opening 23 may be provided in the body member 13 connected as by piping 24 to atmosphere. As soon as the intake valve 11 again operates to admit air or gas through intake 12 and atmospheric or normal pressure again exists within the intake of the compressor, the piston 16 is again forced forwardly, thus returning the valve 15 firmly against its seat.

The relief valve 15 may also act to relive extreme pressures within the cylinder 10 if such excessive pressure should exist at any time during normal operation. To open the valve 15 with atmospheric pressure being exerted against the piston 16 requires a pressure within the compressor cylinder 10 sufficient to compress springs 20 and 21 and allow the piston 16 and valve 15 to move from the positions shown in Fig. 2.

In certain installations, as, for instance, when the cylinder 10 shown in the drawing is the high pressure cylinder of a compressor, the spring 20 may be omitted. With the relief valve thus used the opening 19 may be connected to a point in the compressor system within which an intermediate pressure normally exists, such as an intercooler. As soon as the intake is closed by the regulator or unloader valve 11, the pressure is reduced within the intercooler, thus relieving the piston 16 of a portion of the pressure holding it toward the closed position of the valve 15.

What I claim is:

1. A cylinder relief valve for compressors comprising in combination, a body member adapted for connection to a cylinder, a valve therein having a cylindrical guiding surface in said body member and opening and closing a passage therethrough, a cylinder within said body member, a piston movable within said cylinder and acting against said valve, said valve and piston being freely laterally adjustable, a spring housed within said piston normally forcing said piston and valve in a direction to close said passage, a spring housed within said valve and tending to force said valve from said piston and toward its closed position, and means whereby air may be exhausted from said cylinder.

2. A cylinder relief valve for compressors comprising in combination, a body member adapted for connection to a cylinder, a valve therein having a cylindrical guiding surface in said body member and opening and closing a passage therethrough from said connection to atmosphere, a cylinder within said body member, a hollow piston movable within said cylinder having a plane end surface and acting against said valve upon its plane end surface whereby said valve is free to adjust itself laterally of said piston, a spring housed within said piston normally forcing said piston and valve in a direction to close said passage, a spring housed within said valve and tending to force said valve from said piston, and means whereby air may be exhausted from said cylinder.

WARD RAYMOND.